(No Model.)
J. M. WILLIAMS.
NUT LOCK.
No. 252,564. Patented Jan. 17, 1882.
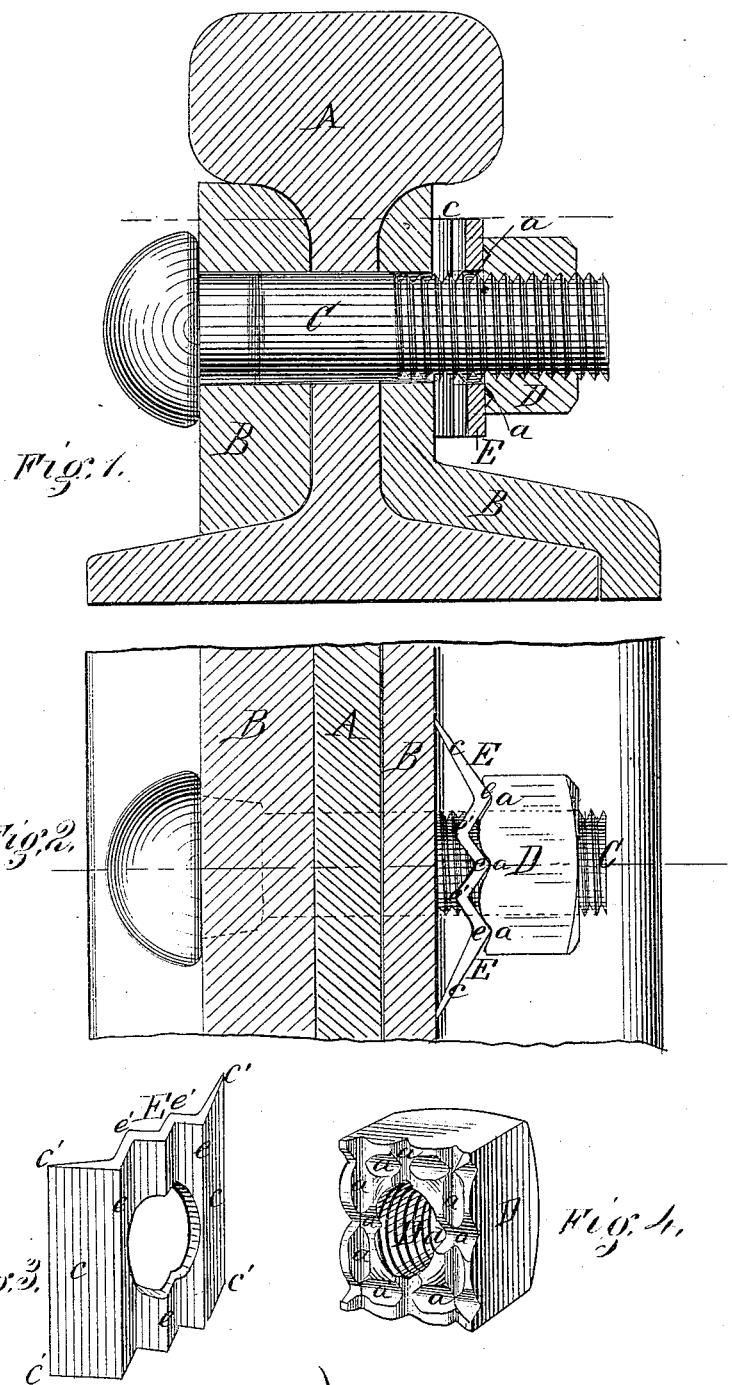
Witnesses:
C. L. Harker
R. H. Whinley
Inventor John M. Williams,
By Attorney George H. Christy.

UNITED STATES PATENT OFFICE.

JOHN M. WILLIAMS, OF PITTSBURG, ASSIGNOR TO HIMSELF AND HUGH McDONALD, OF ALLEGHENY CITY, PENNSYLVANIA.

NUT-LOCK.

SPECIFICATION forming part of Letters Patent No. 252,564, dated January 17, 1882.

Application filed October 31, 1881. (No model.)

*To all whom it may concern:*

Be it known that I, JOHN M. WILLIAMS, of Pittsburg, county of Allegheny, State of Pennsylvania, have invented or discovered a new and useful Improvement in Nut-Locks; and I do hereby declare the following to be a full, clear, concise, and exact description thereof, reference being had to the accompanying drawings, making a part of this specification, in which—like letters indicating like parts—

Figure 1 is a sectional view of a rail-joint, showing a nut, bolt, and washer illustrative of my invention. Fig. 2 is a horizontal sectional view of the same parts, looking downward. Fig. 3 is a perspective view of the washer, and Fig. 4 is a similar view of the nut.

My invention relates to that class of nut-locks which employ a corrugated spring-washer and a nut having its inner face scored or grooved to receive the ridges of the corrugations on the washer.

My invention consists, in general terms, in combining with the bolt a spring-washer corrugated in one direction with parallel corrugations which extend entirely across the face of the washer, and a nut having grooves made in its inner face, which are also parallel, extending entirely across the face of the nut, and adapted to register with and receive the ridges on the washer, as hereinafter more fully described and claimed.

In the drawings, A represent the section of a railroad-rail; B B, the fish or splice bars, and C a bolt used in securing the parts, such parts being of the usual or any suitable construction and form.

The nut D is locked on the bolt by the following means: Grooves or channels *a* are made in the inner face of the nut, two or more in number, parallel and extending across the face. I have shown three such grooves—the preferable number—which are arranged equidistant, one being made through the center and one on either side of the hole *d* in the nut. I have also shown two sets of such grooves made at right angles across the nut, for purposes hereinafter described. In combination with such nut I make use of a corrugated washer, E, having three ribs or corrugations, *e e e*, on its outer face, made parallel, equidistant, and adapted in form and relationship to enter in unison one set of grooves, *a*, in the nut. The sides *c c* are beveled down to comparatively sharp edges, as shown, and they are bent inward beyond the two intermediate inner ridges or corrugations, *e' e'*, so that these sharp side edges first take bearing on the plate B, as illustrated in Fig. 2. Owing to their tapered form, they yield readily to the pressure of the nut as it is screwed down, sliding outward until the intermediate edges, *e' e'*, bear upon the plate, and thereby give a firm bed for the nut. As the nut is thus screwed down the sharp corners at *c'* bite or cut into the bar B sufficiently to prevent the washer from turning. I also prefer to make the ridges *e* and *e'* of the corrugations sharp, as shown, in which case the inner ridges, *e' e'*, when pressed upon the plate, as described, will also indent or take a bite upon the plate and insure the position of the washer as the nut is finally screwed home, at which time the tendency to turn the washer is strongest.

The distance between the plate B and ridges *e' e'* of the washer before the latter is compressed represents the elastic movement or range of elastic movement of the washer. In turning the nut, as the grooves *a* come in line with or over the ridges *e e* the latter will be pressed into the former by the elasticity of the edges *c c*, and in order to turn the nut past such ridges in either direction the washer must be compressed. This may be done by the usual means employed for screwing on nuts; but the lock afforded by the ridges when seated in the grooves, especially when the nut is screwed well down, is sufficient to prevent any accidental turning of the nut on the washer, and as the washer is prevented from turning by the bite taken by its sharp edges, the nut can be unscrewed only on applying considerable force by design.

In case the nut should be left with its grooves inclined to the ridges of the washer the nut may unscrew sufficiently to bring the grooves and ridges in line, when the elasticity of the washer will force the ridges into the grooves and prevent further unscrewing. By making two sets of grooves in different directions across the nut, as shown, a quarter-turn of the nut will align the grooves and ridges.

Heretofore the grooves in the nut and the ridges or corrugations in the washer have been made radial, or from the center outward; but in such construction difficulty is experienced, when a spring-washer is employed, in preventing the washer from turning, thus allowing the nut to unscrew. This difficulty is obviated in my improvement by the sharp edges and angles or corners of the washer brought to bear on the splice-bar. Also, in such prior construction of radial corrugations it is very difficult to compress the washer materially. Consequently such washers are but slightly elastic. This is due principally to the radial arrangement of the corrugations, as in such arrangement the metal cannot expand or move laterally or circumferentially, lateral movement being opposed in both directions by the pressure upon adjoining corrugations. Consequently such radial corrugations can be compressed only by radial enlargement of the washer, which is impracticable. By making the grooves and corrugations parallel, as in my invention, this difficulty is also obviated. The washer is free to spread in either direction as the corrugations are compressed, and the full elasticity of the washer is secured, as above described.

These washers E are made of steel tempered sufficiently to give them the spring action described.

I claim herein as my invention—

1. The combination of bolt C, nut D, having parallel grooves $a$ in and extending across its face, and the corrugated spring-washer E, having its ridges or corrugations extending parallel across the washer in one direction, and adapted in form and relationship to register with the grooves in the nut, substantially as set forth.

2. As a device for locking nuts on bolts, the corrugated spring-washer E, having sharp beveled edges $c\ c$, such edges extending beyond the plane of the ridges of the intermediate corrugations on the same side, as described, in combination with nut D, having parallel grooves $a$ in its face adapted to receive the ridges of the washer, substantially as set forth.

In testimony whereof I have hereunto set my hand.

JOHN M. WILLIAMS.

Witnesses:
C. L. PARKER,
R. H. WHITTLESEY.